United States Patent

Kawashima

(10) Patent No.: US 9,539,885 B2
(45) Date of Patent: Jan. 10, 2017

(54) VEHICLE BACK DOOR

(71) Applicant: TOYOTA JIDOSHA KABUSHIKI KAISHA, Toyota-shi (JP)

(72) Inventor: Mutsumi Kawashima, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/895,142

(22) PCT Filed: May 29, 2014

(86) PCT No.: PCT/JP2014/064309
§ 371 (c)(1),
(2) Date: Dec. 1, 2015

(87) PCT Pub. No.: WO2014/203706
PCT Pub. Date: Dec. 24, 2014

(65) Prior Publication Data
US 2016/0114663 A1    Apr. 28, 2016

(30) Foreign Application Priority Data

Jun. 19, 2013 (JP) ................................. 2013-128842

(51) Int. Cl.
*B60J 5/10* (2006.01)
*B60R 13/07* (2006.01)

(52) U.S. Cl.
CPC ............... *B60J 5/107* (2013.01); *B60R 13/07* (2013.01)

(58) Field of Classification Search
CPC ........... B60J 5/107; B60J 5/0481; B60R 13/07
See application file for complete search history.

(56) References Cited

U.S. PATENT DOCUMENTS

| 2005/0202223 A1* | 9/2005 | Harima | B60J 5/00 428/292.1 |
| 2008/0185874 A1* | 8/2008 | Kimoto | B32B 5/12 296/203.01 |
| 2012/0306231 A1* | 12/2012 | Ginestet | B60J 5/107 296/76 |
| 2014/0105669 A1* | 4/2014 | Coudron | B62D 25/00 403/30 |

FOREIGN PATENT DOCUMENTS

| EP | 2 653 331 | * 10/2013 |
| GB | 506986 | * 6/1939 |
| JP | 2005-212590 A | 8/2005 |
| JP | 2008-37122 A | 2/2008 |
| JP | 2008-105437 A | 5/2008 |
| JP | 2009-196478 A | 9/2009 |
| WO | WO 2014/061268 | * 4/2014 |

OTHER PUBLICATIONS

International Search Report Issued Sep. 2, 2014 in PCT/JP14/064309 Filed May 29, 2014.

* cited by examiner

*Primary Examiner* — Gregory Strimbu
(74) *Attorney, Agent, or Firm* — Oblon, McClelland, Maier & Neustadt, L.L.P.

(57) ABSTRACT

A convex portion is provided on a door outer panel. Thus, when the door outer panel is thermally expanded, the convex portion is compressed along the direction of a plane of the door outer panel, so a gap the convex portion is crushed. That is, a dimensional difference that has occurred between the door outer panel and a door inner panel along the direction of the plane of the door outer panel is absorbed through compressive deformation of the convex portion.

4 Claims, 7 Drawing Sheets

FIG. 5B
Related Art

VEHICLE BACK DOOR

TECHNICAL FIELD

The invention relates to a vehicle outer plate member made of resin, and a vehicle back door.

BACKGROUND ART

For example, Japanese Patent Application Publication No. 2005-212590 (JP 2005-212590 A) discloses an automobile outer plate member made of fiber-reinforced resin (FRP), which employs an FRP member. In this related art, an outer plate made of FRP and an inner plate made of FRP are joined to each other while facing each other.

SUMMARY OF THE INVENTION

Problem to be Solved by the Invention

In consideration of the aforementioned fact, the invention provides a vehicle outer plate member made of resin and a vehicle back door that make it possible to absorb a dimensional difference that occurs between a fiber-reinforced resin member and a resin member, which has a larger linear expansion coefficient than the fiber-reinforced resin member, due to thermal expansion, in the case where these members are joined to each other.

Means for Solving the Problem

In a first aspect of the invention, there is provided a vehicle outer plate member made of resin. This vehicle outer plate member has a resin member and a slack portion. The resin member is joined to a fiber-reinforced resin member, and has a larger linear expansion coefficient than the fiber-reinforced resin member. The slack portion is arranged inside a joint portion of the resin member joined to the fiber-reinforced resin member, is extended along two different directions in a direction of a plane of the resin member, and has a convexly or concavely formed cross-sectional shape when cut along a direction perpendicular to the directions of extension.

In the aforementioned aspect of the invention, the fiber-reinforced resin member and the resin member, which are different in linear expansion coefficient from each other, are joined to each other. The slack portion is provided inside the joint portion of the resin member joined to the fiber-reinforced resin member. This slack portion is extended along the two different directions in the direction of the plane of the resin member, and has the convexly or concavely formed cross-sectional shape when cut along the direction perpendicular to the directions of extension of the slack portion.

The linear expansion coefficient of the resin member is larger than the linear expansion coefficient of the fiber-reinforced resin member. Therefore, a dimensional difference occurs between the resin member and the fiber-reinforced resin member due to thermal expansion at the time of high temperature, so a thermal strain is produced in the resin member.

Therefore, in the invention, the resin member is provided with the slack portion having the convex or concave cross-sectional shape. Thus, when the resin member is thermally expanded, the slack portion is compressed along the direction of the plane of the resin member, and a gap in the slack portion is crushed. That is, the dimensional difference that has occurred between the resin member and the fiber-reinforced resin member along the direction of the plane of the resin member is absorbed in the two directions (one direction and the other direction) through compressive deformation of the slack portion.

A second aspect of the invention is obtained by modifying the first aspect of the invention as follows. That is, the slack portion may be configured to include a first slack portion that is extended along one of the two directions while being inclined in a vehicle vertical direction with respect to a vehicle width direction, and a second slack portion that is extended along the other of the two directions while being inclined in the vehicle vertical direction with respect to the vehicle width direction.

In the aforementioned configuration, the slack portion is configured to include the first slack portion and the second slack portion. The first slack portion and the second slack portion are extended while being inclined in the vehicle vertical direction with respect to the vehicle width direction. Thus, the dimensional difference that has occurred between the resin member and the fiber-reinforced resin member along the direction of the plane of the resin member can be absorbed in the two directions (the vehicle width direction and the vehicle vertical direction) in each of the first slack portion and the second slack portion.

A third aspect of the invention is obtained by modifying the first aspect of the invention as follows. The vehicle outer plate member made of resin is obtained by modifying the vehicle outer plate member made of resin as follows. That is, the first slack portion and the second slack portion may be linked with each other and formed continuously to each other.

According to the aforementioned configuration, the first slack portion and the second slack portion are formed continuously to each other. Therefore, the absorbable amount of the dimensional difference that occurs between the resin member and the fiber-reinforced resin member due to thermal expansion is larger than in the case where the first slack portion and the second slack portion are formed discontinuously from each other.

A fourth aspect of the invention is obtained by modifying any one of the first to third aspects of the invention as follows. That is, the slack portion may be formed in the resin member along a direction intersecting with a flow direction of resin in molding the resin member.

In the aforementioned configuration, the slack portion is formed in the resin member along the direction intersecting with the flow direction of resin in molding the resin member. The amount of thermal expansion of the resin member is larger in the direction along the flow direction of resin than in the direction intersecting with the flow direction. Therefore, in the invention, the dimensional difference that has occurred between the resin member and the fiber-reinforced resin member due to thermal expansion can be efficiently absorbed by specifying the direction in which the slack portion is formed with respect to the flow direction of resin.

A fifth aspect of the invention is obtained by modifying any one of the first to fourth aspects of the invention as follows. That is, the slack portion may be provided at a location that is not exposed to a design surface.

According to the aforementioned configuration, the slack portion is provided at the location that is not exposed to the design surface. Therefore, even when the vehicle outer plate member is provided with the slack portion, no inconvenience arises in terms of design.

In a sixth aspect of the invention, there is provided a vehicle back door. This vehicle back door has a door inner panel, a door outer panel, intersection portions, and an inclined portion. The door inner panel is formed of the fiber-reinforced resin member according to any one of the first to fifth aspects of the invention, is arranged inside a vehicle interior, and constitutes a back door inner plate. The door outer panel is formed of the resin member according to any one of the first to fifth aspects of the invention, is arranged outside the door inner panel with respect to the vehicle interior, and constitutes a back door outer plate. The intersection portions are arranged below a water drainage hole penetrating the door outer panel in the vehicle vertical direction, constitute a part of the slack portion according to any one of the first to fifth aspects of the invention, and intersect with each other. The inclined portion constitutes the other part of the slack portion and is inclined downward in the vehicle vertical direction as a distance measured outward in the vehicle width direction increases, with each of the intersection portions serving as a peak portion.

In the aforementioned configuration, the door inner panel that is arranged inside the vehicle interior and that constitutes the back door inner plate is formed of the fiber-reinforced resin member. Besides, the door outer panel that is arranged outside the door inner panel with respect to the vehicle interior and that constitutes the back door outer plate is formed of the resin member.

The slack portion that is provided on the door outer panel is extended along the two different directions in the direction of the plane of the door outer panel. The intersection portions that intersect with each other are arranged below the water drainage hole penetrating the door inner panel, in the vehicle vertical direction. Besides, the slack portion is provided with the inclined portion that is inclined downward in the vehicle vertical direction as the distance measured outward in the vehicle width direction increases, with each of the intersection portions serving as the peak portion, Therefore, the water discharged from the water drainage hole to the outside of the vehicle can be guided outward in the vehicle width direction and downward in the vehicle vertical direction, through the inclined portion from the intersection portions of the slack portion.

Effects of the Invention

As described above, the vehicle outer plate member made of resin has an excellent effect of making it possible to absorb the dimensional difference that occurs between the fiber-reinforced resin member and the resin member, which has a larger linear expansion coefficient than the fiber-reinforced resin member, due to thermal expansion, in the case where these members are joined to each other.

The vehicle outer plate member made of resin has an excellent effect of making it possible to more effectively absorb the dimensional difference that occurs between the members due to thermal expansion.

The vehicle outer plate member made of resin has an excellent effect of making it possible to more effectively absorb the dimensional difference that occurs between the resin member and the fiber-reinforced resin member due to thermal expansion, than in the case where the first slack portion and the second slack portion are formed discontinuously from each other.

The vehicle outer plate member made of resin has an excellent effect of making it possible to more effectively absorb the dimensional difference that occurs between the resin member and the fiber-reinforced resin member due to thermal expansion.

The vehicle outer plate member made of resin has an excellent effect of making it possible to form the slack portion without being restricted in terms of design.

The vehicle back door has an excellent effect of making it possible to guide the water discharged from the water drainage hole in an intended direction, through the use of the slack portion.

MODES FOR CARRYING OUT THE INVENTION

One embodiment of a vehicle outer plate member made of resin according to the invention will be described hereinafter using the drawings. Incidentally, in these drawings, arrows UP, W and OUT, which are shown as appropriate, indicate a vehicle front side, a vehicle upper side, a vehicle width direction, and a vehicle outward direction respectively.

Configuration of Vehicle Outer Plate Member Made of Resin

Figure 4:
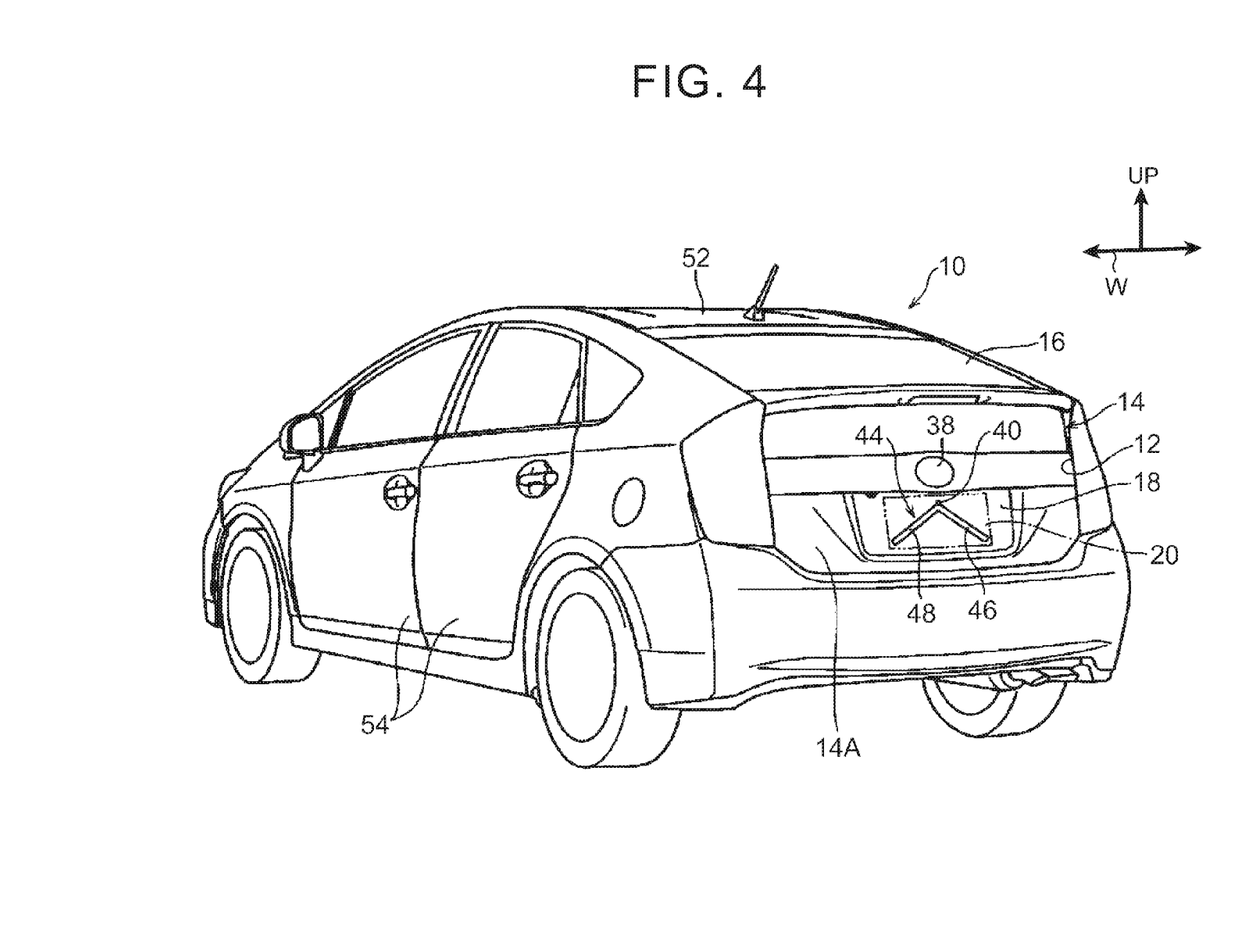
FIG. 4 is a perspective view of the back door to which the vehicle outer plate member made of resin according to the present embodiment of the invention is applied, as viewed diagonally from behind a vehicle.

As shown in FIG. 4, a door opening portion 12 is formed at a rear end portion of a vehicle 10. A door hinge (not shown) is provided at an upper edge portion of the door opening portion 12. A back door 14 as the vehicle outer plate member made of resin is turnably supported by this door hinge. The door opening portion 12 can be opened/closed by the back door 14.

Incidentally, a back door window glass 16 is attached to an upper portion of the back door 14. Besides, a license plate attachment portion 18, which dents more forward in a vehicle longitudinal direction than a general surface 14A of the back door 14, is provided at a center of a lower portion of the back door 14. A license plate 20 that is indicated by a fictitious line can be attached to the license plate attachment portion 18.

Figure 1:
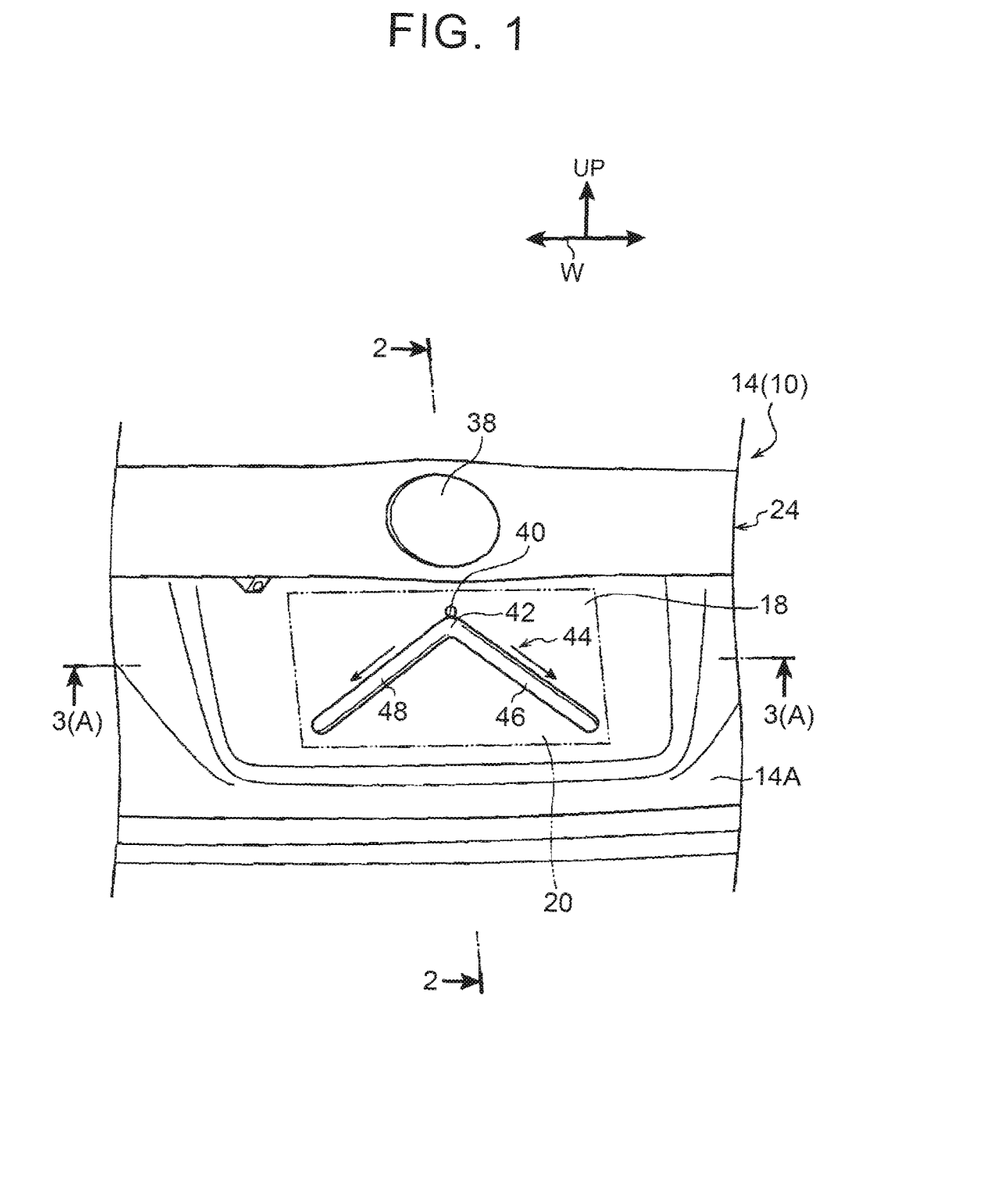
FIG. 1 is an enlarged perspective view showing an enlarged state of an essential part in FIG. 4, in a back door to which a vehicle outer plate member made of resin according to the present embodiment of the invention is applied.
Figure 2:
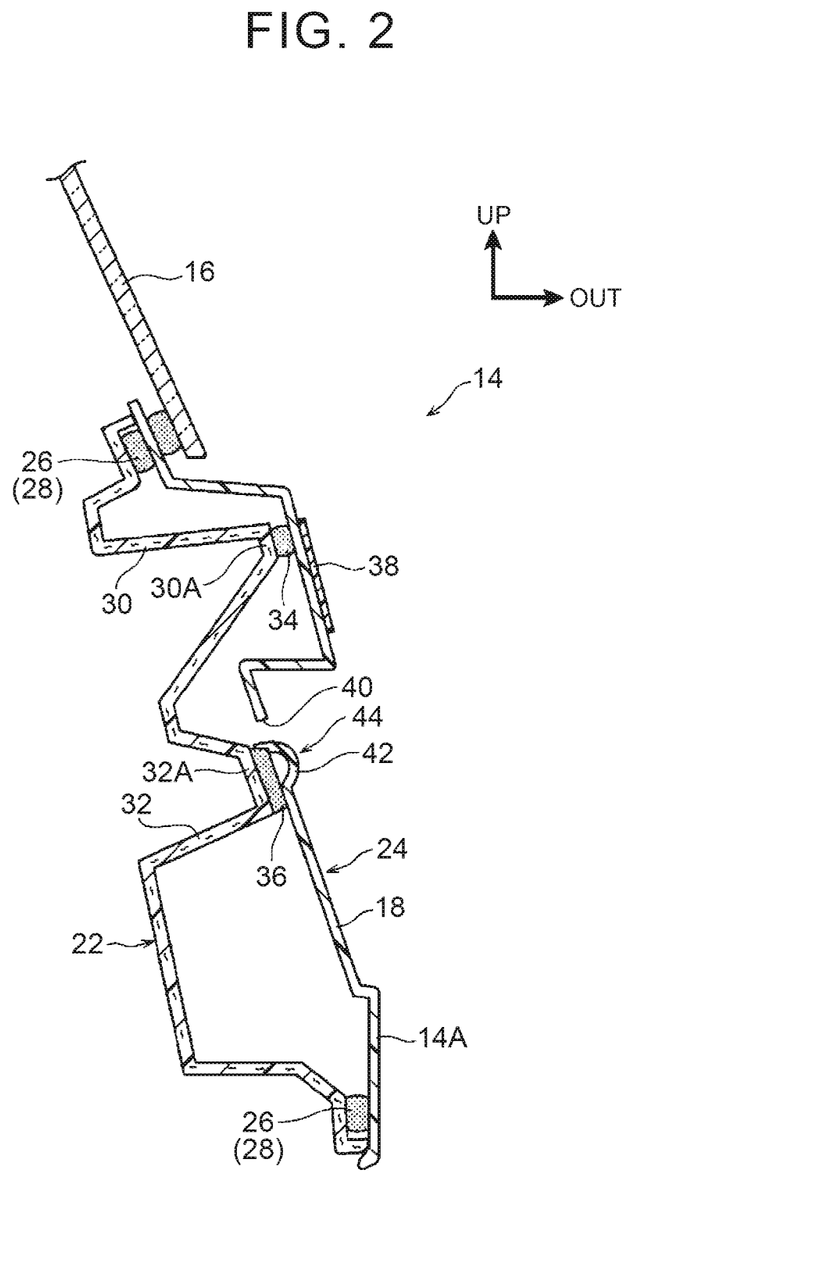
FIG. 2 is a longitudinal sectional view showing a state cut along a line 2-2 of FIG. 1.

FIG. 2 is a cross-sectional view showing the back door 14 that is cut, at the center of the lower portion thereof, along the vehicle vertical direction as shown in FIG. 1. As shown in FIG. 2, the back door 14 is equipped with a door inner panel 22 and a door outer panel 24. The door inner panel 22 is a fiber-reinforced resin (FRP) member that is arranged inside a vehicle interior and that constitutes a door inner plate. The door outer panel 24 is a resin member that is arranged outside this door inner panel 22 with respect to a vehicle interior and that constitutes a door outer plate. Incidentally, it is possible to mention, for example, Toyota Super Olefin Polymer (TSOP) (registered trademark), a thermoplastic resin that is mainly composed of PP and EPDM, and the like as the resin member that has a larger linear expansion coefficient than the fiber-reinforced resin member.

Although not shown in any of the drawings, for example, the door inner panel 22 assumes a rectangular shape in an elevation view as viewed from behind the vehicle. An adhesive 26 is applied to an outer edge portion of the door inner panel 22. The door inner panel 22 and the door outer panel 24 are joined to each other (at a joint portion 28) via this adhesive 26.

Besides, protrusion portions 30 and 32 that protrude backward with respect to the vehicle are provided inside the joint portion 28, which extends along the direction of the plane of the door inner panel 22, The protrusion portions 30 and 32 are extended along the vehicle width direction respectively. Each of peak portions 30A and 32A of the protrusion portions 30 and 32 has a surface that is opposed to the door outer panel 24. Adhesives 34 and 36 are applied to the peak portions 30A and 32A respectively.

A back door handle (not shown) for opening the back door 14 is disposed rockably along the vehicle longitudinal direction, below an emblem 38 provided on the door outer panel 24 in the vehicle vertical direction, at the center of the lower portion of the back door 14. An insertion portion (not shown) through which this back door handle is inserted is formed through the door outer panel 24. A water drainage hole 40 for discharging the water flowing in from inside the insertion portion to the outside of the vehicle is formed below the insertion portion in the vehicle vertical direction.

The peak portions 30A and 32A of the protrusion portions 30 and 32 that are provided on the door inner panel 22 are equivalent to peripheral portions of the insertion portion. The door outer panel 24 and the door inner panel 22 are joined to each other, and the gap between the door outer panel 24 and the door inner panel 22 is sealed, by the adhesives 34 and 36.

As shown in FIG. 1, a convex portion 44, which is a slack portion that is formed in a mountainous shape with a side below the water drainage hole 40 in the vehicle vertical direction serving as a peak portion (an intersection portion) 42, is formed on the license plate attachment portion 18 of the door outer panel 24. The convex portion 44 protrudes backward with respect to the vehicle.

To explain concretely, the convex portion 44 is configured to include an inclined portion 46 as a first slack portion, and an inclined portion 48 as a second slack portion. The first slack portion is extended in such a direction as to be inclined downward in the vehicle vertical direction as the distance measured outward in the vehicle width direction increases (to be inclined in the vehicle vertical direction with respect to the vehicle width direction) on the right side in the vehicle width direction as viewed from behind the vehicle, around the peak portion 42. The second slack portion is extended in such a direction as to be inclined downward in the vehicle vertical direction as the distance measured outward in the vehicle width direction increases on the left side in the vehicle width direction as viewed from behind the vehicle, around the peak portion 42.

Figure 3A:
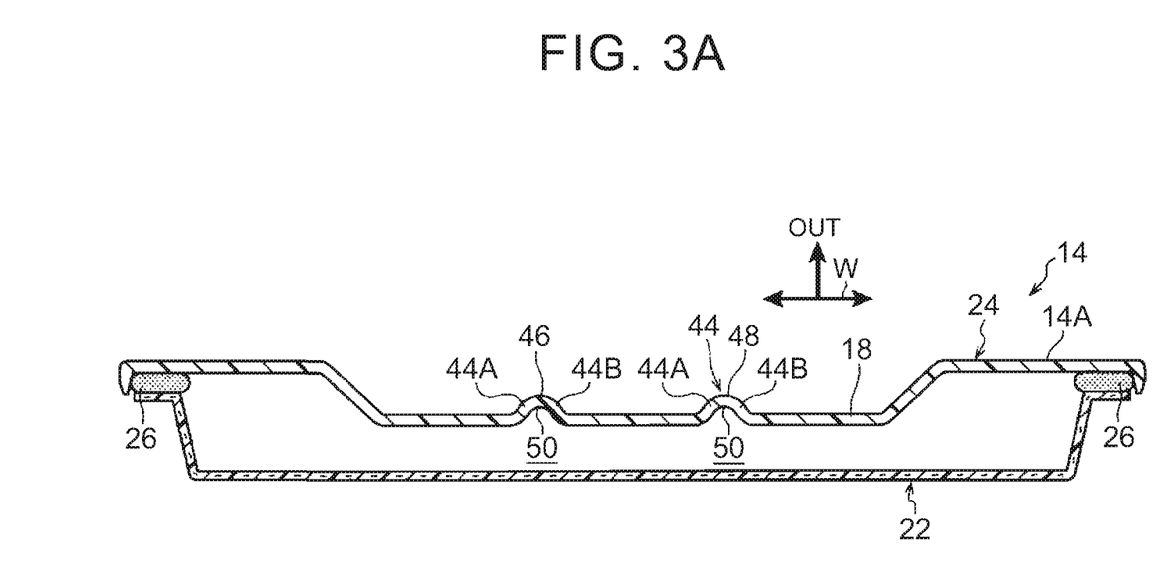
FIG. 3A is a horizontal sectional view showing a state cut along a line 3(A)-3(A) of FIG. 1.

Besides, as shown in FIG. 3A, the convex portion 44 assumes a convex R-shape in a cross-section along a width direction that is perpendicular to a longitudinal direction (an extension direction) thereof. A gap 50 is provided between opposed surfaces 44A and 44B that are substantially opposed to each other on the convex portion 44. Incidentally, the extension direction of this convex portion 44 is formed along a direction intersecting with the flow direction of resin in molding the door outer panel 24.

Operation and Effect of Vehicle Outer Plate Member Made of Resin

As shown in FIG. 3A, the door inner panel 22 that constitutes a part of the back door 14 is formed of fiber-reinforced resin, and the door outer panel 24 that constitutes the other part of the back door 14 is formed of the resin member. Then, the door outer panel 24 and the door inner panel 22 are joined to each other by the adhesive 26 to be integrated with each other.

Figure 5A:
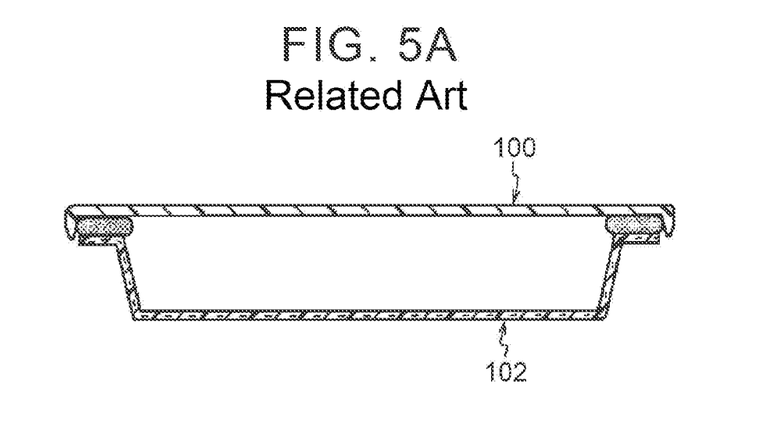
FIG. 5A is a comparative example corresponding to FIG. 3A.
Figure 5B:
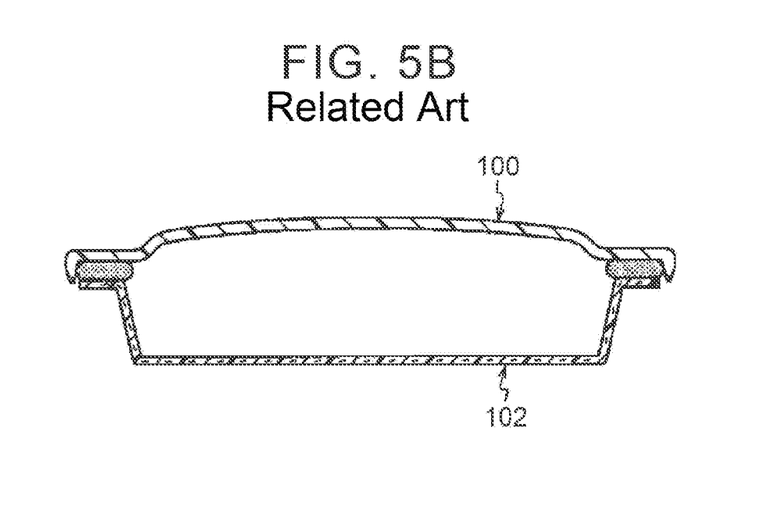
FIG. 5B is a comparative example corresponding to FIG. 3B.

In general, in the case where the resin member 100 and the fiber-reinforced resin member 102, which are different in linear expansion coefficient from each other, are joined to each other as shown in FIG. 5A, a dimensional difference occurs between the resin member 100 and the fiber-reinforced resin member 102 due to thermal expansion at the time of high temperature as shown in FIG. 5B, because the linear expansion coefficient of the resin member 100 is larger than the linear expansion coefficient of the fiber-reinforced resin member 102. As a result, a thermal strain is produced in the resin member 100.

Figure 3B:
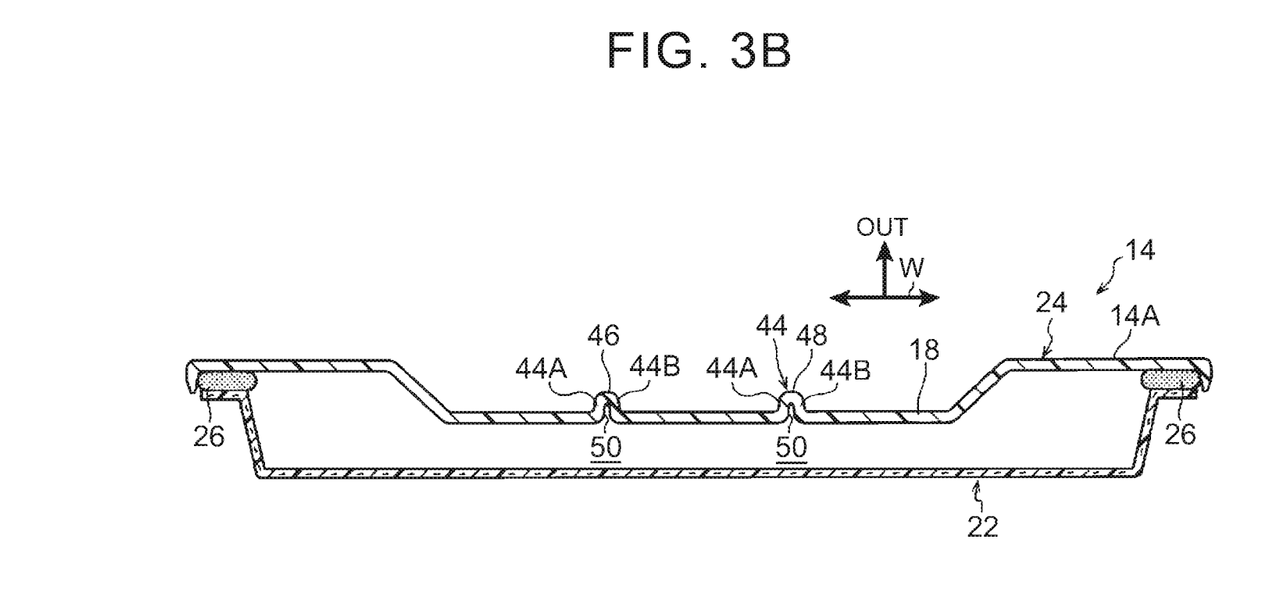
FIG. 3B is a horizontal sectional view showing a state cut along the line 3(A)-3(A) of FIG. 1 at the time when the vehicle outer plate member made of resin is thermally expanded.

Therefore, in the present embodiment of the invention, as shown in FIG. 3A, the convex portion 44 is provided on the door outer panel 24. Thus, when the door outer panel 24 is thermally expanded, the convex portion 44 is compressed along the direction of the plane of the door outer panel 24, and the gap 50 in the convex portion 44 is crushed as shown in FIG. 3B. That is, the dimensional difference that has occurred between the door outer panel 24 and the door inner panel 22 along the direction of the plane of the door outer panel 24 is absorbed through compressive deformation of the convex portion 44.

That is, according to the present embodiment of the invention, in the case where the door outer panel 24 that is formed of the resin member and the door inner panel 22 that is formed of the fiber-reinforced resin member are joined to each other, the dimensional difference that occurs between the door outer panel 24 and the door inner panel 22 due to thermal expansion can be absorbed.

It should be noted herein that the convex portion 44 assumes a mountainous shape in an elevation view as viewed from behind the vehicle, and that the inclined portions 46 and 48 are formed while being inclined in the vehicle vertical direction with respect to the vertical width direction around the peak portion 42, as shown in FIG. 1. Therefore, each of the inclined portions 46 and 48 can absorb the dimensional difference that occurs between the door outer panel 24 and the door inner panel 22 along the direction of the plane of the door outer panel 24 due to thermal expansion, in the two directions (the vehicle width direction and the vehicle vertical direction).

Besides, the convex portion 44 is continuously formed with the inclined portions 46 and 48 linked with each other around the peak portion 42. Thus, the absorbable amount of the dimensional difference that occurs between the door outer panel 24 and the door inner panel 22 due to thermal expansion is larger than in the case where the inclined portions 46 and 48 are formed discontinuously from each other. That is, the dimensional difference can be more effectively absorbed.

Besides, in the present embodiment of the invention, the convex portion 44 is provided on the license plate attachment portion 18. Therefore, the convex portion 44 is not exposed to the outside in a state where the license plate 20, which is indicated by a fictitious line, is attached to the license plate attachment portion 18. Accordingly, even if the door outer panel 24 is provided with the convex portion 44, no inconvenience arises in terms of design. In other words, the convex portion 44 can be formed without being restricted in terms of design.

By the way, in general, the amount of thermal expansion of the resin member is larger in the direction along the flow direction of resin in molding the resin member than in the direction intersecting with the flow direction. Therefore, in the present embodiment of the invention, the convex portion 44 is extended along the direction intersecting with the flow direction of the resin, so the dimensional difference that has occurred between the door outer panel 24 and the door inner panel 22 due to thermal expansion can be efficiently absorbed. Incidentally, the flow direction of resin is not shown in any of the drawings, but differs depending on the position of a gate in a die in molding the door inner panel 22. Therefore, the shape of the convex portion 44 may be appropriately changed in accordance with this gate position.

Besides, in the present embodiment of the invention, the peak portion 42 of the convex portion 44, which assumes a mountainous shape, is arranged below the water drainage hole 40 penetrating the door inner panel 22, in the vehicle vertical direction. The inclined portions 46 and 48 that are inclined downward in the vehicle vertical direction as the distance measured outward in the vehicle width direction increases are provided on the right and left sides in the vehicle width direction respectively, around this peak portion 42.

Therefore, the water discharged to the outside of the vehicle from the water drainage hole 40 can be guided outward in the vehicle width direction and downward in the vehicle vertical direction from the peak portion 42 through the inclined portions 46 and 48. That is, the water discharged from the water drainage hole 40 can be guided in intended directions (directions indicated by arrows) through the use of the convex portion 44.

Other Embodiments

Figure 6:
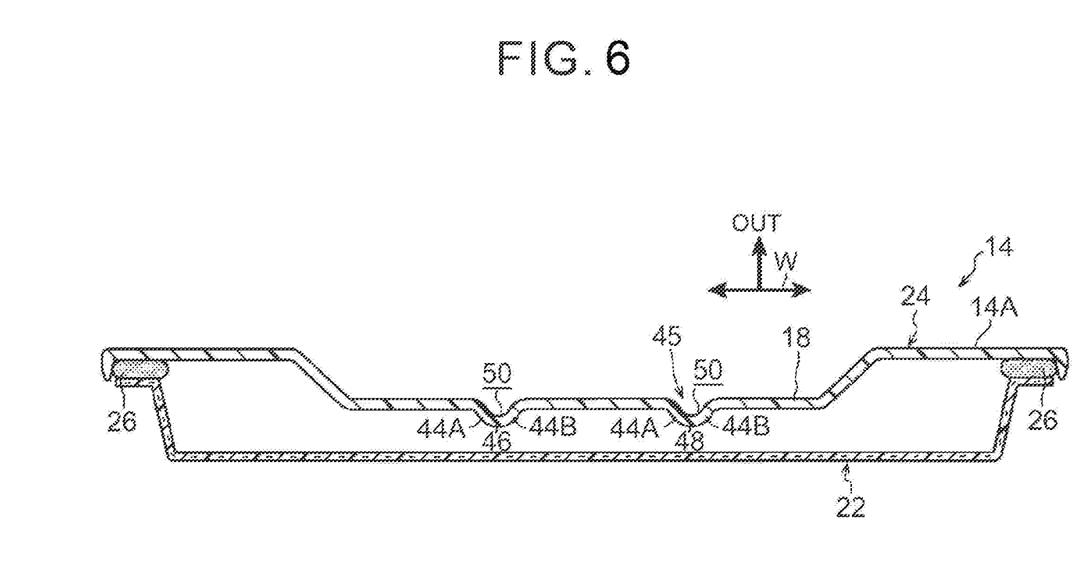
FIG. 6 is a horizontal sectional view showing a slack portion as a concave portion.

Incidentally, in the present embodiment of the invention, the convex portion 44 that protrudes outward with respect to the vehicle interior has been described as an example of the slack portion as shown in FIG. 2. However, the slack portion may be a concave portion 45 that dents inward with respect to the vehicle interior, as shown in FIG. 6. Besides, in the present embodiment of the invention, the convex portion 44 assumes a mountainous shape in an elevation view as shown in FIG. 1, but the shape of the convex portion is not limited thereto.

For example, although not shown in any of the drawings, the convex portion may be formed in the shape of a cross or an asterisk. Besides, the first slack portion and the second slack portion, which constitute the slack portion, are not absolutely required to intersect with each other. As a matter of course, the inclined portion 46 as the first slack portion and the inclined portion 48 as the second slack portion may be discontinuous from each other. It should be noted, however, that an upper end portion of the inclined portion 46 in the vehicle vertical direction and an upper end portion of the inclined portion 48 in the vehicle vertical direction are desired to partially overlap with each other in the vehicle vertical direction in terms of drainage properties.

Besides, in the invention, it is sufficient that a thermal strain produced along the direction of the plane of the resin member be absorbable. Therefore, for example, convex portions that are discontinuous from each other may be formed along the longitudinal direction of the door outer panel 24 (one direction) and the width direction perpendicular to the longitudinal direction (the other direction) respectively.

Furthermore, in the present embodiment of the invention, the adhesive 26 is used at the joint portion 28 between the door inner panel 2 and the door outer panel 4. However, the adhesive 26 is not indispensable. The door inner panel 22 and the door outer panel 24 may be joined to each other with the aid of bolts or welding.

Still further, in the present embodiment of the invention, the license plate attachment portion 18 of the back door 14 shown in FIG. 4 has been described as the vehicle outer plate member made of resin. However, the vehicle outer plate member made of resin is also applicable to a location other than the license plate attachment portion 18. Besides, the vehicle outer plate member made of resin is applicable to a roof panel 52, a side door 54, a hood (not shown) and the like as well as the back door 14. Incidentally, in the case where the vehicle outer plate member made of resin is exposed to a design surface when being applied to these components, a slack portion may be formed in combination with the design.

The embodiment of the invention has been described hereinabove. As a matter of course, however, the invention should not be limited to the foregoing, but can be carried out after being subjected to various modifications other than the foregoing within such a range as not to depart from the gist of the invention.

The invention claimed is:

1. A vehicle back door comprising:
    a door inner panel that is formed by a fiber-reinforced resin member, that is configured to face a vehicle interior, and that constitutes a back door inner plate;
    a door outer panel that is formed by a resin member that has a linear expansion coefficient that is larger than a linear expansion coefficient of the fiber-reinforced resin member, the door outer panel being joined to the door inner panel, being arranged on an outer side of the door inner panel with respect to the vehicle interior, and constituting a back door outer plate;
    a slack structure that is arranged in a vehicle outer surface of the door outer panel and that is disposed inward in a vehicle width direction with respect to joint portions where the door outer panel is joined to the door inner panel, the slack structure including a first slack portion extended along a first direction and a second slack portion extended along a second direction; and
    an intersection structure that is arranged below a water drainage hole in a vehicle vertical direction and that constitutes a part of the slack structure, the water drainage hole penetrating the door outer panel, wherein
    the first slack portion has a convex shape or a concave shape in a cross section perpendicular to the first direction,
    the second slack portion has a convex shape or a concave shape in a cross section perpendicular to the second direction,
    the first slack portion and the second slack portion intersect with each other to form the intersection structure that forms a peak,
    the first slack portion is inclined in a plane of the door outer panel to extend from the peak downward in the vehicle vertical direction as the first slack portion extends outward in the vehicle width direction, and
    the second slack portion is inclined in the plane of the door outer panel to extend from the peak downward in the vehicle vertical direction as the second slack portion extends outward in the vehicle width direction.

2. The vehicle back door according to claim 1, wherein the first slack portion and the second slack portion are linked with each other and formed continuously with each other.

3. The vehicle back door according to claim 1, wherein the first and second directions intersect with a flow direction of resin as the resin member is molded.

4. The vehicle back door according to claim 1, wherein the slack structure is provided at a location in the door outer panel that is covered by a license plate.

\* \* \* \* \*